F. W. ARVINE.
BROMINE STILL.
No. 181,617 — Patented Aug. 29, 1876.
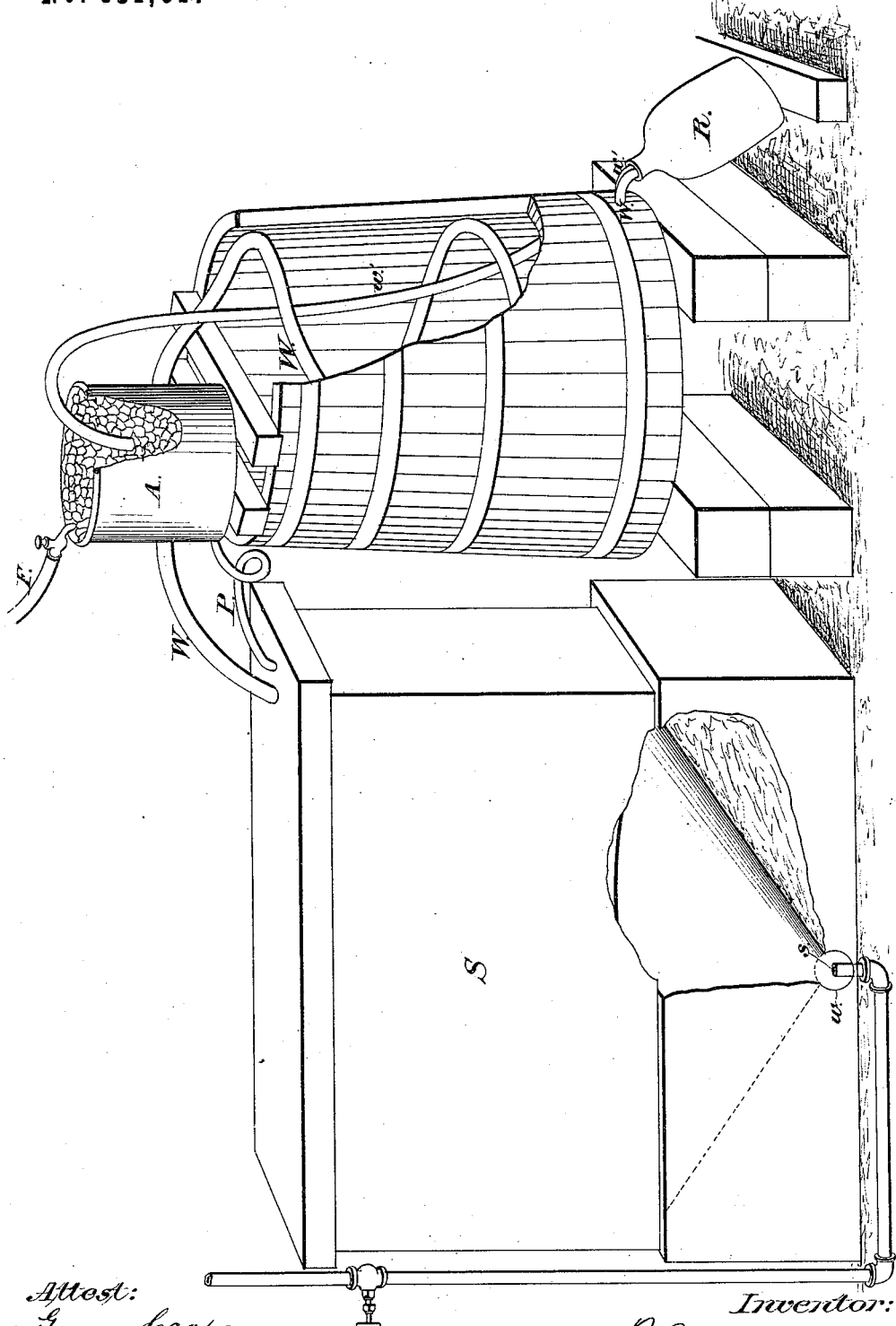
Attest:
George Cooper
Herman Lerner
Inventor:
F. W. Arvine

UNITED STATES PATENT OFFICE.

FREELING W. ARVINE, OF HARTFORD CITY, ASSIGNOR TO H. LERNER, OF MASON CITY, WEST VIRGINIA.

IMPROVEMENT IN BROMINE-STILLS.

Specification forming part of Letters Patent No. 181,617, dated August 29, 1876; application filed May 3, 1875.

*To all whom it may concern:*

Be it known that I, FREELING W. ARVINE, of Hartford City, Mason county, State of West Virginia, have invented a new Bromine Apparatus, of which the following is a specification:

The object of my invention is to economize the materials used in the manufacture of bromine, by saving a portion of the vitriol and manganese, or alkaline chlorate, and by dispensing with the caustic alkali heretofore employed for absorbing the vapors and gases that escape uncondensed from the worms.

It consists of the still shown in the accompanying drawing, which will show the peculiarities of construction to which the following description relates.

The figure of the drawing is a perspective view, with parts broken away to show the construction of the device.

S is the still proper, wherein the bromine is generated by the usual methods.

This still may be made of any of the materials commonly used for the purpose, such as stone, terra-cotta, pottery-ware, or lead; but this still has a funnel-shaped bottom or floor, in the form of an inverted cone, which may be more or less broad in proportion to its depth, according to the nature of materials used.

The apex of this funnel or cone is provided with two perforations—$s$ for the admission of steam, and $w$ for the withdrawal of the waste or exhausted materials. This still is provided with the condensing-worm W, which is surrounded with cold water while in use, and the receiver R is also provided with a worm, $w'$, which serves for additional condensing-surface, and an outlet for the uncondensed gases and vapors of chlorine, chloride of bromine, air, &c., which escape in considerable quantity from the worm and receiver. The second worm, $w'$, continues to absorber A, which is preferably a stone or earthen jar of such size in relation to the still as experience would show to be necessary. Usually about one-twentieth the capacity or size of the still will suffice for the absorber.

The jar A is filled with suitable material, such as coke fragments, or pieces of stone, pottery, glass, or any convenient material, which, in a dry or moist state, may present sufficient and proper surface for the condensation and absorption desired. The small pipe shown in the drawing, and terminating in the faucet F, serves to convey bittern or other suitable liquid for absorbing the vapors and gases from the worm $w'$, and conveying them back to the still S by the curved pipe P.

By this arrangement of still, the offensive gases and vapors which usually escape into the air are entirely absorbed and saved, and the air is allowed to escape freely from the top of the absorber. As the chlorine and chloride of bromine serve to liberate bromine from its natural combinations, their complete return to the still increases the amount of bromine obtained, and lessens the amount of manganese, or alkaline chlorate, and vitriol usually required, while the conical bottom of the still is easily rinsed clean with water, or is cleansed from sediment by the rapid withdrawal of the exhausted liquors.

The steam used in heating and agitating the contents of the still is most advantageously admitted at $s$, since it will only stir up the manganese and oil of vitriol sufficiently when admitted under the charge.

It has been customary in bromine-making to introduce the pipe $w'$ into a dish containing a strong solution of caustic soda, which, when nearly saturated with chlorine, bromine, &c., was then transferred to the still, and sufficient vitriol and manganese added to liberate its bromine. In this method only a portion of the gases was absorbed, and the remainder escaped into the air, to the annoyance of the workmen and neighborhood, and to the loss of the manufacturer. In my arrangement I dispense with the use of caustic alkali, and fully overcome all the objections and disadvantages connected with its use, such as odor, chemicals used to decompose it, and loss of chlorine, while the pressure exerted upon the still by the dipping of this waste-pipe $w'$ into the caustic solution is entirely removed by the arrangement herein described.

I do not limit this construction of still to any particular materials or methods of bromine-making; nor do I claim the use of steam in heating the still, or the use of any particular material. It is shown in foreign technological publications that steam has been used for many years to heat and agitate halogen stills, which have been made of stone, lead, and clay wares.

Having thus described my invention, what I claim as new is—

1. The still-bottom made funnel-shaped, and having a steam-pipe entering at the lowest point, substantially as described.

2. The still-bottom made funnel-shaped, in combination with a steam-pipe entering at its lowest point, and having an annular outlet-orifice around the same, substantially as described.

3. The absorber A, filled with material, substantially as described, in combination with the pipe $w'$, communicating with the receiver R, and the pipe P, communicating with the still S, as and for the purpose described.

F. W. ARVINE.

Witnesses:
GEORGE COOPER,
HERMAN LERNER.